(12) United States Patent
Hunter (10) Patent No.: US 6,462,895 B2
(45) Date of Patent: Oct. 8, 2002

(54) OPTICAL ASSEMBLY MOUNTING (75) Inventor: Andrew Arthur Hunter, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/794,022

(22) Filed: Feb. 28, 2001

(65) Prior Publication Data

US 2001/0033436 A1 Oct. 25, 2001

(30) Foreign Application Priority Data

Apr. 25, 2000 (EP) ............................................ 00303438

(51) Int. Cl.[7] ................................................ G02B 7/02

(52) U.S. Cl. ....................... 359/819; 359/811

(58) Field of Search ................. 359/819, 823, 359/830, 827; 396/530

(56) References Cited

U.S. PATENT DOCUMENTS

| | | | | |
|---|---|---|---|---|
| 5,053,794 A | * | 10/1991 | Benz | 396/432 |
| 5,122,909 A | | 6/1992 | Butler | |
| 5,781,351 A | | 7/1998 | Murakami et al. | |
| 5,825,559 A | * | 10/1998 | Johnson et al. | 359/819 |

FOREIGN PATENT DOCUMENTS

EP  A-0757268  2/1997

* cited by examiner

*Primary Examiner*—Ricky Mack
*Assistant Examiner*—Omar Hindi (57) ABSTRACT

An optical assembly is mounted in an aperture of a non-rigid body having first and second faces between which the aperture extends. The optical assembly is placed within the aperture such that a deformable element disposed around the optical assembly is deformed (by heat or otherwise). In response to deformation of the deformable element, the optical assembly fixedly engages the deformable element which in turn engages the second face of the body around the aperture and exerts a force on a flange of the optical assembly.

45 Claims, 5 Drawing Sheets

OPTICAL ASSEMBLY MOUNTING

FIELD OF THE INVENTION

The invention relates to a mounting for an optical assembly, and to methods of mounting an optical assembly to an object.

PRIOR ART

The essential elements of a camera are a lens system to focus light on to an image plane, together with a sensor located at that image plane. Initially, this "sensor" was photoresponsive film. For many applications it is now desirable to have a sensor which has electrical signals as an output (such as charge coupled detectors (CCD)). It is particularly desirable for this sensor to have a digital output, as it is particularly easy to transfer digital data from one device or application to another, and digital data can be stored and transferred with high fidelity.

The versatility of use possible with digital sensors has been restricted, because conventional digital sensors have been relatively expensive. However, improvements in technology have now reduced the cost of such sensors. A particularly advantageous sensor type is the CMOS sensor, of which an example is described in EETimes, Oct. 12, 1998, Issue 1030. Sensors of this type can be produced to be particularly inexpensive. The existence of cheap digital optical sensors opens up new possibilities for sensor application.

Figure 1:
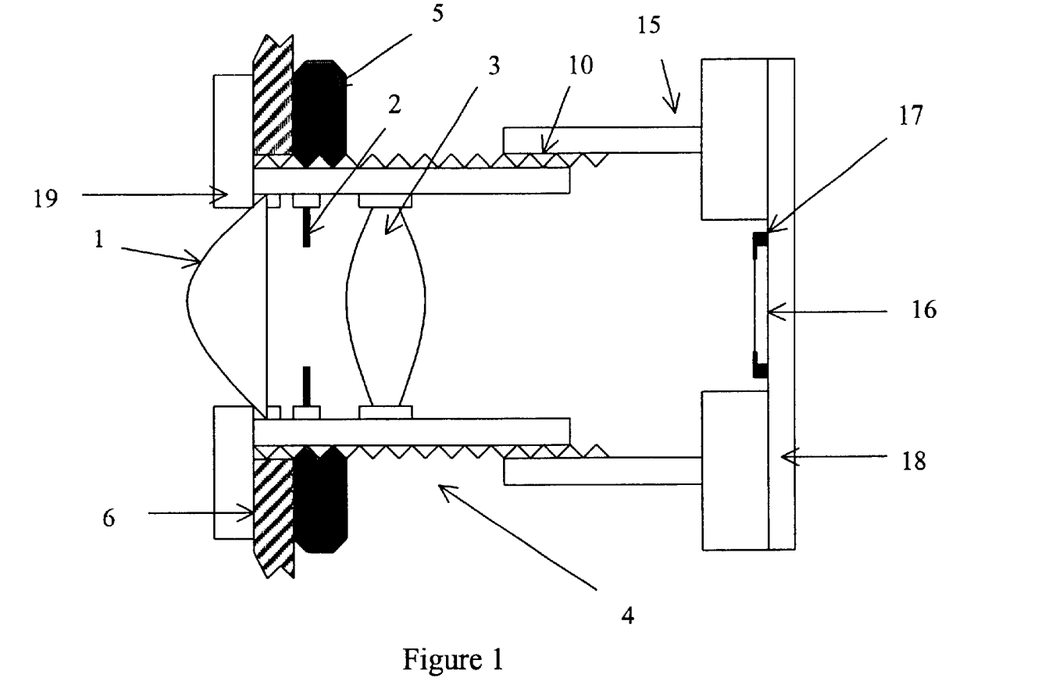
FIG. 1 shows in cross-section a conventional arrangement for mounting a small camera body to an object.

The basic design of a camera system using a CMOS sensor is shown in FIG. 1. The details shown would be substantially similar if another sensor type were chosen. The elements of this camera system will now be described.

The sensor 16, mounted on a PCB substrate 18, is electrically connected to the substrate by connectors 17. The camera system may be in communication, or adapted to communicate, with other system elements through electrical connection to PCB substrate 18. The sensor 16 and substrate 18 are mounted in a sensor housing 15 (in alternative designs the PCB substrate 18 may be larger and not "within" a sensor housing in this way—provided that means are provided to ensure that unwanted light does not reach the sensor). The sensor housing 15 is engaged with lens housing 4—in the arrangement shown, this engagement is adjustable (with screw thread 10) to allow for focussing. Typically, the engagement will be either fixed on assembly (possibly after a focus adjustment step during assembly), but play may be allowed for limited user adjustment depending on design.

The lens housing 4 holds a first lens 1 (typically the main objective lens), which here is held in the housing by retaining ring 19. Both housings 15, 4 and the retaining ring 19 can be conveniently produced as plastics mouldings. Additional optical elements 3 required for satisfactory imaging onto the sensor 16 are mounted within the housing. Depending on the imaging required, there may be none, one or more discrete optical elements used for this purpose in addition to the objective lens 1. Typically, such a system will also need an aperture stop 2 to limit the amount of light entering the system. Such stops are generally thin sheets of metal, coloured black. Here, both stop 2 and additional optical elements 3 are fixed within lens housing 4, but in alternative arrangements one or both of these may be adjustable—normally, however, only adjustment of size of the stop 2 is required, rather than adjustment of its position.

The camera is mounted to a further object 6 by a combination of the retaining ring 19 and a nut 5. While this arrangement is generally effective, it may not be ideal for particular applications. For example, if the camera is mounted to be an internal part of some larger object, it may be difficult for the screw thread to be tightened effectively. The possibility of the nut 5 working itself loose may also be particularly undesirable where a very tight seal is required—such as where the connection point 6 to the further object is a flexible material (e.g. the fabric material of a child's toy). It is desirable to achieve a reliably secure fixing of the optical assembly, but without any risk of damage to the delicate optical assembly itself, and preferably at low cost and suited to the mounting of cameras in relatively inaccessible locations.

STATEMENT OF INVENTION

Accordingly, in a first aspect the invention provides a method for mounting an optical assembly in an aperture of a body, the body having a first face and a second face between which the aperture extends, the method comprising: placing the optical assembly within the aperture such that a flange of the optical assembly abuts the first face of the body around the aperture; and deforming a deformable element disposed around the optical assembly such that the deformation of the deformable element causes a fixed engagement to be made between the optical assembly and the second face of the body around the aperture.

The invention therefore allows an effective, but extremely simple and versatile, mounting of an optical assembly to a body. The optical assembly is fixed in position relative to the body, and the disposition of the deformable element post-deformation is such as to render the mounting secure.

The deformable element may be deformable by pressure or by heat or both. A heat-deformable element may also be a glue (in the sense that it forms a chemical bond with at least one of the system components that it abuts)—if the body is a fabric or other flexible (or even elastic) material, then it may be particularly useful for the deformable element to bond with the body—but it may simply be adapted to reflow and cool into a mechanically rigid form which provides a physical barrier to breaking of the fixed engagement between the optical assembly and the body.

If further elements are provided for association with the optical assembly, it is advantageous to provide a mounting collar as an additional element. This is placed around the optical assembly where it extends from the second face. Deformation of the deformable element provides fixed engagements between the mounting collar and the optical assembly, and between the mounting collar and the second face of the body around the aperture—heating of the mounting collar may be the method used to provide heat to a heat-deformable element (this is particularly effective if the mounting collar is made of a metal or another material with high thermal conductivity). This approach may be used if the optical assembly is to be connected to a camera assembly—the mounting collar may be provided with a means for connection to the camera assembly, or may even be a part of the camera assembly itself.

In a second aspect, the invention provides an optical assembly kit for use in mounting an optical assembly in an aperture of a body, the body having a first face and a second face between which the aperture extends, the kit comprising: an optical assembly adapted for placement within the aperture such that a flange of the optical assembly abuts the first face of the body around the aperture; and a deformable element adapted for deformation after placement of the optical assembly within the aperture such that the deformation of the deformable element causes a fixed engagement to be made between the optical assembly and the second face of the body around the aperture.

The kit is advantageously adapted to the method as described above. In particular embodiments, the kit comprises a camera assembly, and a mounting collar for mounting the camera assembly to the optical assembly. In this case, it is advantageous that deformation of the deformable element provides fixed engagements between the mounting collar and the optical assembly, and between the mounting collar and the second face of the body around the aperture.

DESCRIPTION OF FIGURES

Specific embodiments of the invention will now be described, by way of example, with reference to the accompanying drawings, in which:

FIGS. 4A to 4E show in cross section a second embodiment of a mounting arrangement according to the invention suitable for use with the integrated lens assembly of FIG. 2 FIG. 4C shows the connection of the mounted lens to assembly of FIG. 4B to the other components of a camera, whereas

DESCRIPTION OF SPECIFIC EMBODIMENTS

The present invention is not limited in application to the camera arrangement as illustrated in FIG. 1. It is, however, particularly applicable to this arrangement, and so the embodiments described are illustrated in the form of camera arrangements of this type. The different mounting arrangements shown can however be used, in accordance with the invention, in different contexts (for example, with a different sensor—rather than a CMOS sensor, the image could be formed on photographic film or even on the human eye).

Figure 2:
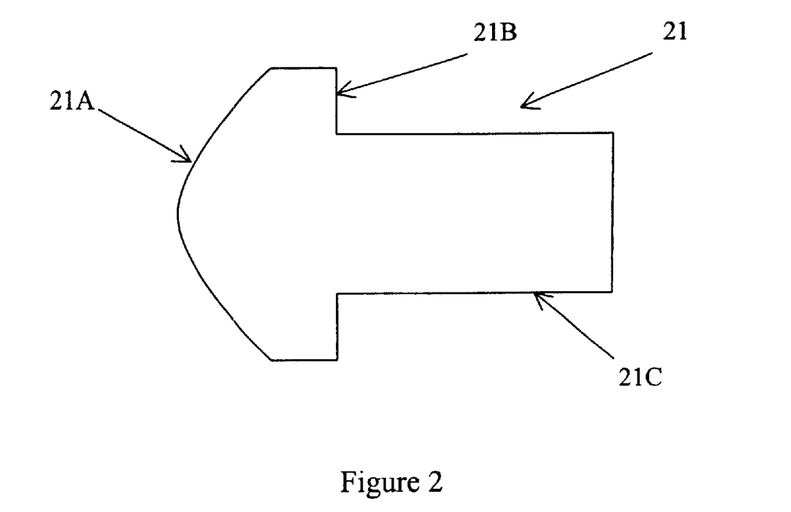
FIG. 2 shows in cross-section an integrated lens assembly for use in a small camera.

A useful development from the lens assembly (comprising objective lens 1, stop 2, and further optical element 3) shown in FIG. 1 is the integrated assembly shown in FIG. 2. In this integrated assembly 21, all the optical elements of the camera arrangement (apart from those in the detector 16 itself) are replaced by an integrated whole—these may either be formed as a single element, or formed separately and bonded to form an integrated whole. The objective lens 1 is replaced by a collection part 21A, terminated by a shoulder 21B which may advantageously be used as a stop (perhaps by appropriate treatment of the shoulder surface). Any additional modification of signal light can be provided by appropriate optical properties in a stub region 21C. The integrated lens assembly 21 may be fabricated, for example, by taking components similar to the objective lens 1, stop 2, and additional optical elements 3 of FIG. 1 and bonding them together with index-matching optical cement.

Specific mounting arrangements described below are illustrated with respect to the lens assembly described in FIG. 2, as this lens assembly is particularly effective for use in small, low-cost digital cameras. However, the embodiments of mounting methods and arrangements described below are not limited in their application to lens assemblies of this type. All the arrangements described below could be used to greater or lesser effect with a lens assembly 4 of the type shown in FIG. 1 (without the external screw thread, and with any modifications made to the lens barrel equivalent to those required below for the stub region). The invention is particularly relevant for use in connection with mounting a small camera or other imaging device to another object of which the camera is to form an integral part, and is particularly relevant where it is desirable to mount the camera to an element which is not rigid or otherwise robust.

Figure 3A:
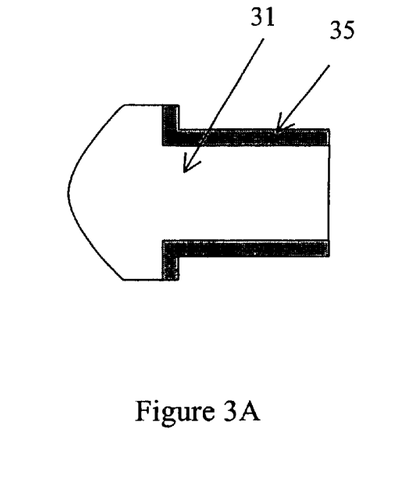
FIGS. 3A and 3B show in cross-section, before and after mounting respectively, a first embodiment of a mounting arrangement according to the invention suitable for use with the integrated lens assembly of FIG. 2.
Figure 3B:
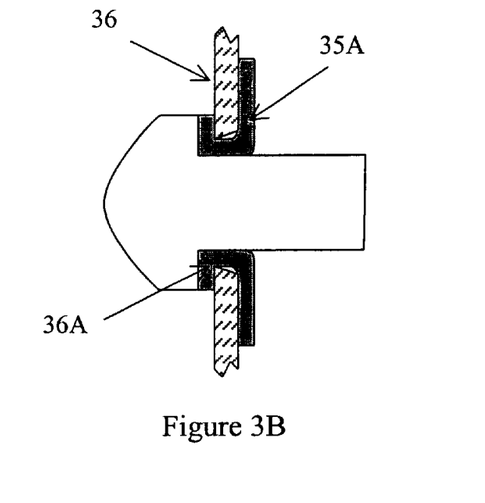

A first embodiment of a method and apparatus for mounting a lens assembly to another object is shown in FIGS. 3A and 3B. A lens assembly 31 of the type shown in FIG. 2 is surrounded by a jacket of hot melt glue 35 or other deformable material, as shown in FIG. 3A. To fix the lens assembly 31 into position in an aperture 36A of a body 36, the lens assembly is positioned so that the shoulder of the lens assembly abuts the body 36 around the aperture 36A, and a heated member is applied to the glue jacket 35 to force it away from the stub region 31A of the lens assembly 31 and against the wall of the body 36 around the aperture 36A, so trapping a part of the wall of the body 36 between the shoulder of the lens assembly 31 and the deformed glue jacket 35A. Clearly, there needs to be enough of the body wall trapped to ensure that the lens assembly 31 cannot be forced through the aperture 36A from either direction. The effectiveness of the mounting will also be greatly enhanced if the glue (or other material) of glue racket 35 is adapted to bond effectively with the material of body 36. If these materials do bond effectively, then this embodiment may be particularly suitable for use with bodies 36 made of soft, flexible or even elastic material. (Elastic material in particular would cause difficulty in arrangements which provided only a mechanical, rather than a chemical, bond between the body 36 and the lens assembly 31.)

Figure 4A:
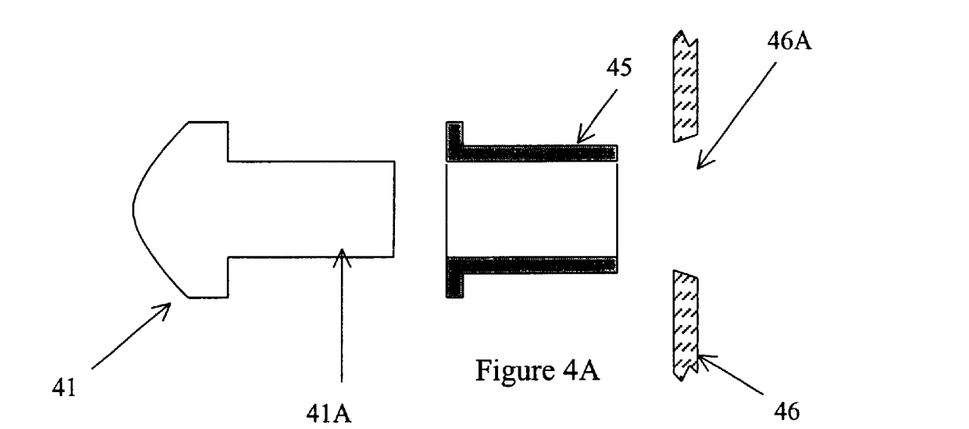
–FIG. 4A shows the lens assembly and the mounting components before mounting.
Figure 4B:
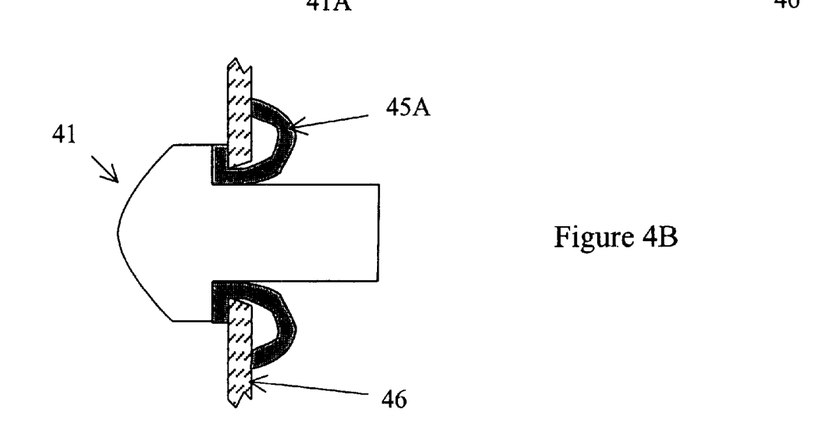
FIG. 4B shows the lens assembly and the mounting components after mounting.

A second embodiment of a mounting method and arrangement for a lens assembly is shown in FIGS. 4A and 4B. The main elements are shown in FIG. 4A—a lens assembly 41 of the type shown in FIG. 2, a body 46 with an aperture 46A, and in this case a deformable collar 45 adapted to slide over the stub region 41A of the lens assembly 41.

The deformable collar 45 is passed over the lens assembly 41, and then the lens assembly 41 jacketed in the deformable collar 45 is passed through the aperture 46A. After this, the lens assembly 41 is pressed towards the aperture from the collection part end, and the deformable collar 45 is pressed towards the aperture from the stub end—the collar 45 deforms to trap the wall of the body 46 between the shoulder of the lens assembly 41 and the deformed part 45A of the collar. This approach is particularly straightforward to accomplish and predictable in its effect (as the deformation of the collar is precisely controlled and there is no requirement for chemical bonding), but may not be so suitable for bodies 46 lacking rigidity, particularly if the bodies 46 are elastic.

Figure 4C:
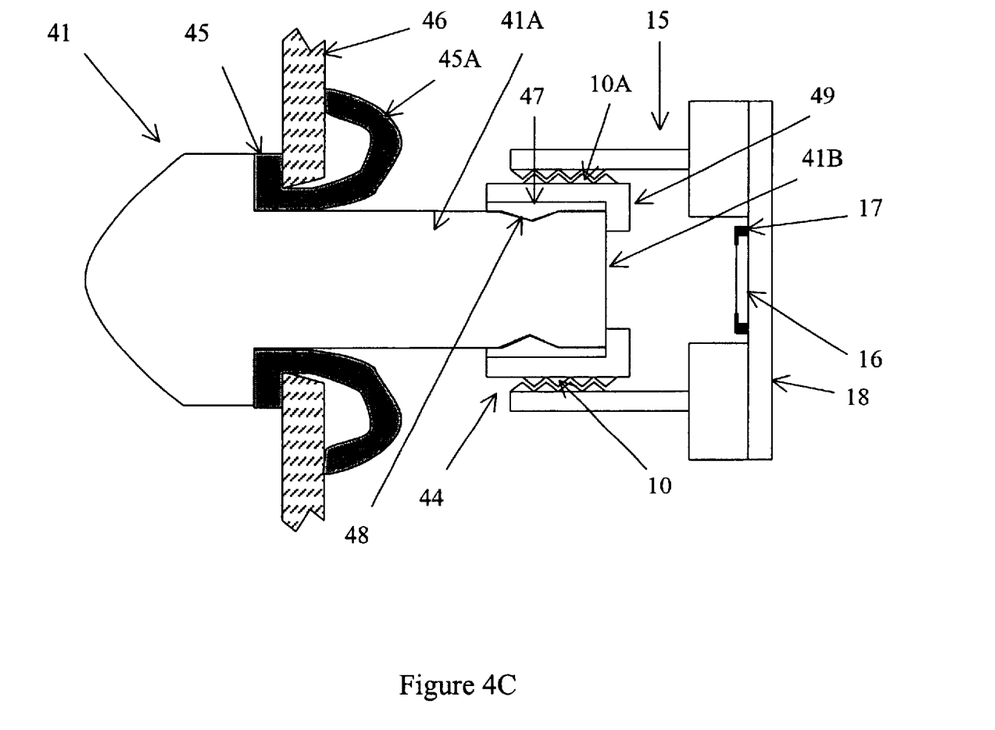
Figure 4D:
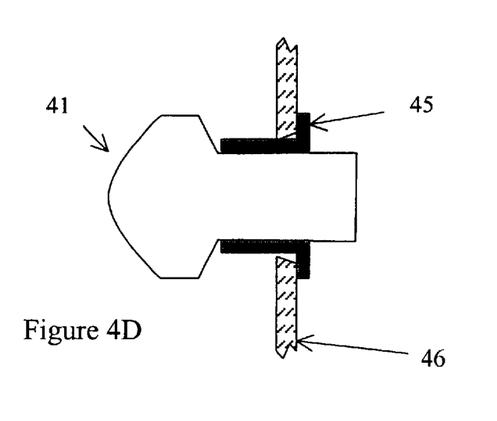
FIGS. 4D and 4E show a minor variant on FIGS. 4A and 4B.
Figure 4E:
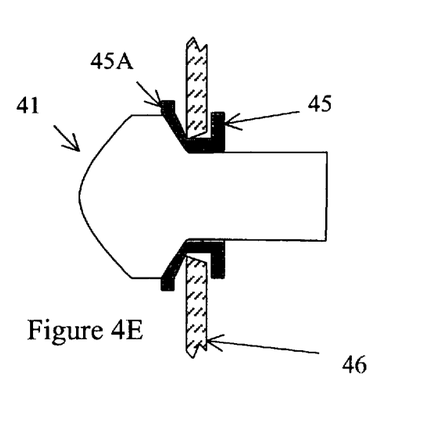

This deformable collar 45 has some similarities to a conventional rivet. An arrangement still more similar to conventional riveting is shown in FIGS. 4D and 4E. It is desirable in this case for the shoulder of the lens assembly 41 to slope (otherwise the rivet is likely to buckle in an unpredictable way). A rivet-like collar 45 is shown passed over the lens assembly (this could be done either before or after the lens assembly 41 has been passed into the aperture 46A) and again pressure on the collar 45 and the lens assembly 41 leads to collar deformation in which the wall 46 is retained by the deformable collar 45.

In both the arrangements shown in FIGS. 3B and 4B, if the optical assembly as a whole is a camera, there remains a need to fix the mounted lens assembly to the remaining parts of the camera. FIG. 4C shows an exemplary way to achieve this for the component of FIG. 4B (though the component of FIG. 3B could as easily have been chosen).

The elements of the sensor body 15 of the camera are essentially as shown in FIG. 1: a sensor body 15 with an internal screw thread 10 for connection to a lens assembly, and a digital sensor (such as a CMOS sensor) 16 mounted to a printed circuit board substrate 18 with electrical connections 17 between the sensor and the printed circuit board 18. To connect the mounted lens assembly 41 to the sensor body 15, a mounting collar 44 is provided. This mounting collar 44 is fixed to the lens assembly 41 such that the end of the stub portion 41A of the lens assembly abuts an endstop 49 of the mounting collar 44, the mounting collar 44 having an external screw thread 10A for engagement with the screw thread 10 of the sensor body 15. Typically, adjustment will only be required during assembly (to pre-set focus), and alternative methods to a screw thread may be employed.

The main additional step involved in assembly is the fixing of the mounting collar 44 to the lens assembly 41. Alternative types of engagement between the mounting collar 44 and the lens assembly 41 are possible—the main requirements are that the mounting collar 44 is fixed firmly to the lens assembly, and that the optical surface 41B of the lens assembly 41 presented to the optical sensor 16 is not contaminated or damaged. In the exemplary approach shown here, the mounting collar 44 is provided with a layer of hot melt glue 47 on its inner surface. In addition, the lens assembly 41 is provided with a neck 48 at which the diameter of the lens assembly 41 (in a part of the stub region 41A) is reduced. To achieve engagement, mounting collar 44 is slid onto the lens assembly 41 and held firmly against it so that the endstop 49 prevents material from glue layer 47 from flowing onto the optical surface 41B, and a heating element is placed so as to heat the glue layer 47 and cause it to take up the shape of the cavity between the mounting collar 44 and the lens assembly 41. This glue layer can then provide both a chemical bond between the mounting collar and the lens assembly 41 (with an appropriate choice of materials) but also, or instead, a mechanical engagement caused by the filling of neck 48 with glue material. Again, it is not necessary even in this exemplary arrangement for the material of glue layer 47 to be a "glue"—in this case a heat deformable plastics material that will provide an effective mechanical engagement when melted into neck 48 will be an effective choice, even if it does not chemically bond the mounting collar 44 and the lens assembly 41.

Figure 5A:
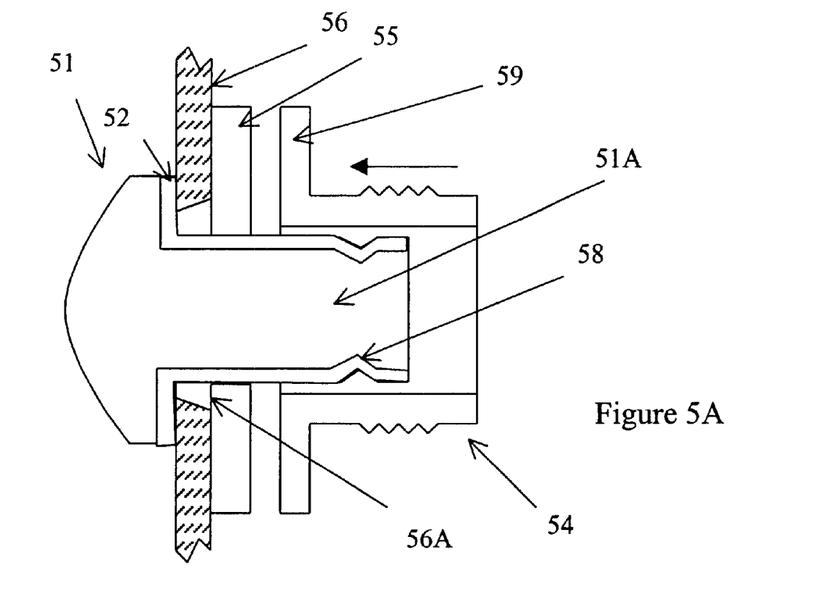
FIG. 5A shows in cross-section a third embodiment of the a mounting arrangement according the invention and suitable for use with the integrated lens assembly of FIG. 2.
Figure 5B:
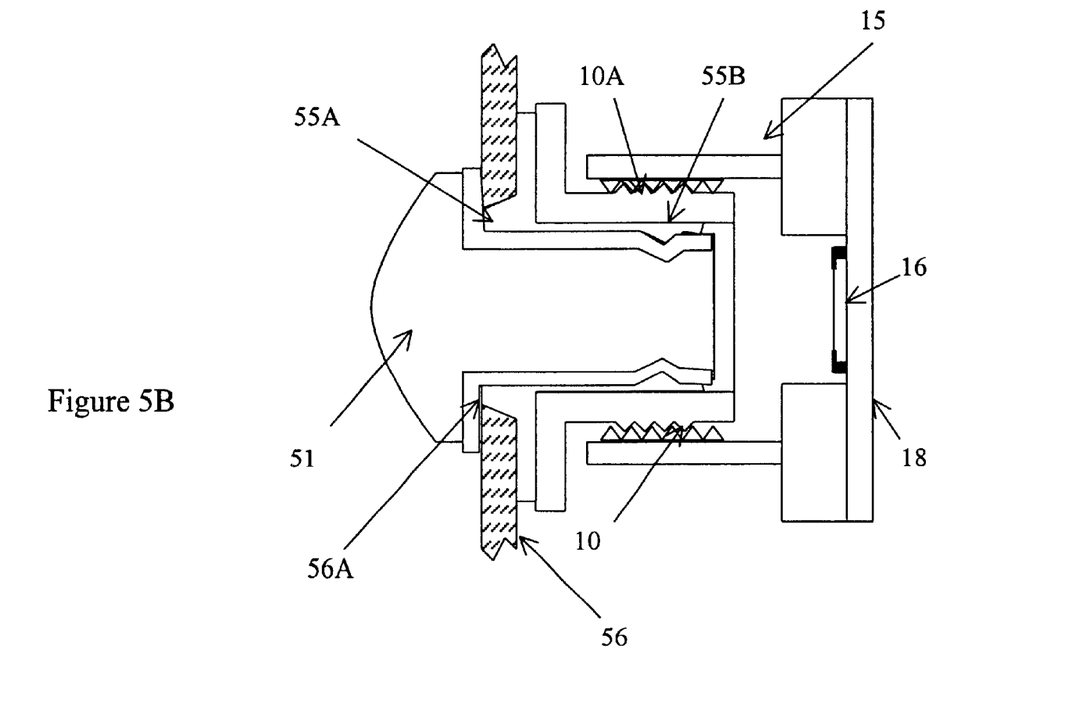
FIG. 5B shows in cross-section the lens assembly mounted as in FIG. 5A and connected to the other components of a camera.

In many circumstances it will be desirable for the step of mounting the lens assembly within the aperture to be better combined with the step of mounting the lens assembly to the sensor body—thus minimizing the overall number of assembly steps. FIGS. 5A and 5B show a third embodiment of the invention in which a mounting collar 54 is used to achieve engagement of the lens assembly 51 with a material body 56 as well as engagement of the lens assembly 51 with the sensor body 15 (with a screw thread connection 10 as before).

Lens assembly 51 substantially resembles that shown in FIG. 4C (including the presence of a neck 58 in the stub region) but with an additional element of a shell layer 52. Shell layer 52 is used to provide a stop at the shoulder of the lens assembly 51, and may also play a role in engagement of the lens assembly 51 with other components (as will be described below). Shell layer 52 has however no fundamental significance to this embodiment, and could be excluded from this embodiment (or included in the earlier described embodiments) without departure from the invention.

The mounting collar 54 has no endstop in the embodiment as illustrated (though again could employ an endstop without departure from the invention), but does have a screw thread 10A on an outer surface for engagement with the screw thread 10 of the sensor body 15. In addition, the mounting collar 54 has a flange 59 at one end. The other component of the mounting system is a ring 55 of hot melt glue (or other material which can be melted or subjected to plastic deformation).

As shown in FIG. 5A, the lens assembly 51 is placed within the aperture 56A of the material body 56 as described in previous embodiments. The next step is the mounting of the ring 55 on to the stub portion 51A of the lens assembly 51 such that the ring is pressed against the "camera-side" wall of the material body 56. The key assembly step involves then pressing the mounting collar 54 on to the stub portion 51A of the lens assembly and against the ring 55. At this point, the ring 55 should be heated or otherwise treated so that it melts or deforms to flow into the spaces between the mounting collar 54 and the lens assembly 51, and advantageously between the mounting collar 54, the material body 56, and the lens assembly 51 also (as shown in FIG. 5B). A particularly effective way to achieve this heating of the ring 55 is to heat directly the mounting collar 54, as this ensures that heat is uniformly applied to the appropriate parts of the ring 55. The deformed ring forms sealing structure 55B. In the arrangement as shown, it is necessary for sealing structure 55B to be chemically bonded to the mounting collar 54, but this is not necessary in all comparable embodiments (it may be avoided, for example, by providing an appropriate neck in the inner wall of the mounting collar 55). In the arrangement as shown, it is not essential for the sealing structure 55B to bond chemically to material 56 or shell layer 52—however, a particularly effective choice of materials for sealing structure 55B on the one hand and body material 56 and shell layer 52 on the other hand would be such that effective chemical bonds are made by adjacent components. An effective chemical bond between the sealing structure 55B and the material of the material body 56 may be particularly valuable where the material of the material body 56 is soft or flexible.

Figure 6:
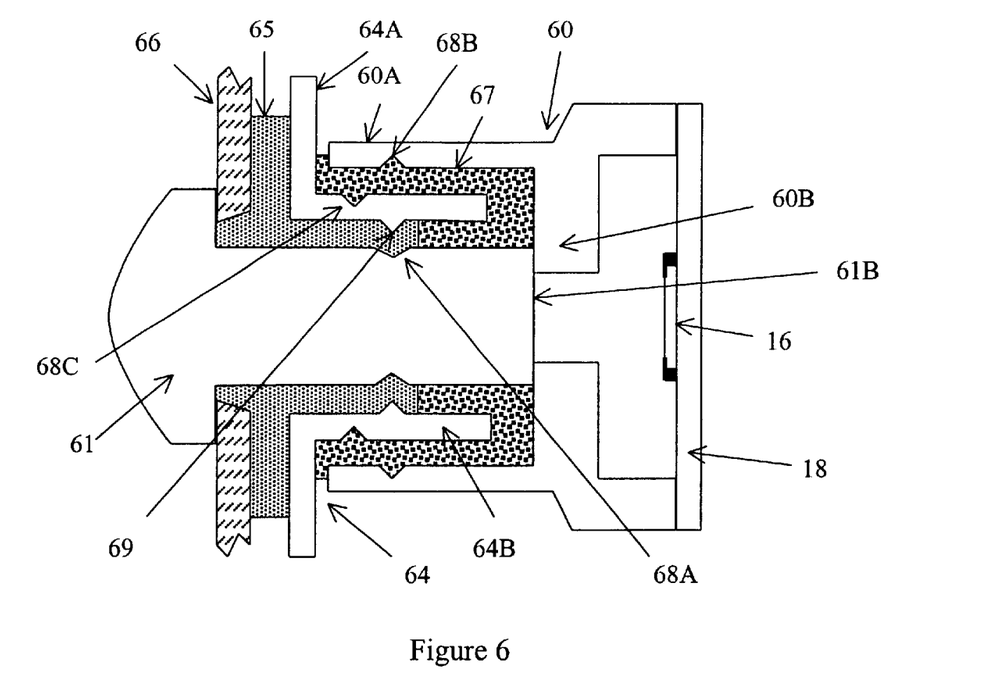
FIG. 6 shows in cross-section a fourth embodiment of the mounting arrangement according to the invention and suitable for use with the integrated lens assembly of FIG. 2.

In particular arrangements, it may be desirable to integrate fully the engagement of the lens assembly and the material body with the engagement of the lens assembly and the sensor assembly. FIG. 6 illustrates a fourth embodiment of the invention in which this is achieved.

The lens assembly 61 and the material body 66 are substantially as shown in previous embodiments. The sensor assembly 60 differs from the sensor body 15 of previous embodiments in that it has no internal screw thread. Instead, the sensor assembly 60 has a barrel 60A with a smooth inner bore provided with a neck 68B. A mounting collar 64 is provided, similar in form to that shown in FIGS. 5A and 5B but without any screw thread. The mounting collar 64 has a flange 64A facing the material body and a barrel 64B—the barrel 64B is smooth both internally and externally, but has a ridge 69 on its inner surface and a neck 68C on its outer surface.

Also provided are two deformable components 65, 67, shown in a deformed state in FIG. 6 (which illustrates the position after assembly). These components should be provided in a form such that after heating, they deform into the positions shown in FIG. 6. This may be, for example, by providing a ring (similar to that shown in FIG. 5A) adapted to deform into first sealing element 65 and a sleeve around mounting collar 64 adapted to deform into second sealing element 67 (care needs to be taken with this arrangement to prevent air bubble formation at any interface between the two sealing elements). Assembly may consist of pressing the sensor assembly 60 against the lens assembly 61 until the end stop 60B of the sensor assembly 60 abuts the lens assembly 61 (thus protecting the optical surface 61B of the lens assembly 61), and then melting/deforming the deformable elements by an appropriate mechanism—the most appropriate such mechanism may again be to heat the mounting collar 64, perhaps particularly if a material is used for the melting collar which has a high thermal conductivity (typically, a metal).

As can be seen from FIG. 6, in this arrangement no chemical bond is essential. The combination of deformation of the deformable components 65, 67 and the necks 68A, 68B and 68C and the ridge 69 is such as to bond mechanically the lens assembly, the material body, and the sensor assembly. For the reasons discussed with respect to the third embodiment, it may however be advantageous for the deformable components to bond on deformation with the lens assembly 51, the mounting collar 64, the inner surface of the sensor assembly barrel 60A and particularly the material of the material body 66.

Figure 7:
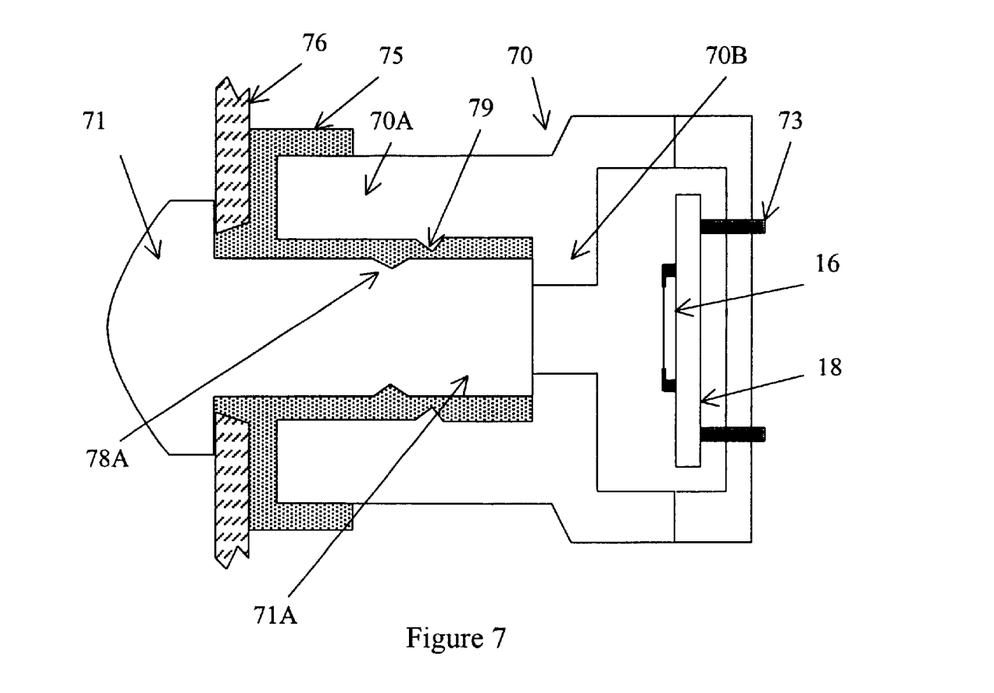
FIG. 7 shows in cross-section a fifth embodiment of the mounting arrangement according to the invention and suitable for use with the integrated lens assembly of FIG. 2.

A fifth embodiment of the invention is shown in FIG. 7. This fifth embodiment is essentially similar to the fourth embodiment, but differs in that the role of the mounting collar is taken up by the sensor assembly (so that one less component is required). The sensor assembly 70 has a barrel 70A with an inner diameter not much greater than the outer diameter of the stub portion 71A of the lens assembly 71. A deformable element is provided in a form which allows it to deform into the state shown in FIG. 7 (perhaps in the form of a sleeve to be slid over lens assembly 71 with a flange to be pressed against the material body 76), with a neck 78A in the lens assembly 71 and a ridge 79 on the inner wall of the sensor assembly barrel 70A used to provide a mechanical engagement (advantageously reinforced by a chemical bond for the reasons discussed above). Again, the deformation step is advantageously preceded by forced abutment of an endstop 70A of the sensor assembly 70 against the lens assembly 71 so that an optical surface 71B of the lens assembly is protected from the deformable or melted element 75.

In this arrangement (and the FIG. 6 arrangement, which could also use this approach), there is no mechanism for adjusting the distance of the sensor assembly 70 from the lens assembly 71. To allow fine adjustment of the distance between the sensor 16 and the lens assembly 71 in order to optimise focus upon the sensor 16, adjustment screws 73 are provided. It will generally be desirable for the sensor 16 to be fully enclosed (isolated), so it is advantageous here for the substrate 18 to be a platform within an enclosure formed by the sensor assembly 70 and the lens assembly 71.

The person skilled in the art will appreciate that the embodiments described above are exemplary rather than definitive, and that modifications and variations of the above may be employed in alternative embodiments of the invention, particularly where these alternative embodiments relate to mounting of optical apparatus other than small cameras, and where the material or structure of the body to which the optical apparatus is to be fixed has particular characteristics other than those indicated in the embodiments above.

What is claimed is:

1. A method of mounting an optical assembly in an aperture of a non-rigid body, the body having a first face and a second face between which the aperture extends when the assembly is mounted on the body, the method comprising:
   placing the optical assembly within the aperture of the non-rigid body; and
   deforming a deformable element disposed around the optical assembly such that a flange of the optical assembly exerts a force against the first face of the body around the aperture and the deformation of the deformable element causes a fixed engagement to be made between the optical assembly and the second face of the non-rigid body around the aperture.

2. A method as claimed in claim 1, wherein the step of deforming the deformable element includes deforming the deformable element by pressure.

3. A method as claimed in claim 2, wherein the deformable element includes a deformable collar, the deformable collar being placed over a portion of the optical assembly extending from the second face.

4. A method as claimed in claim 1, wherein the step of deforming the deformable element includes deforming the deformable element by heat.

5. A method as claimed in claim 4, wherein the deformable element bonds chemically with one or more components of the optical assembly.

6. A method as claimed in claim 4, wherein the deformable element bonds chemically with the body.

7. A method as claimed in claim 4, wherein the deformable element includes a hot melt glue.

8. A method as claimed in claim 4, wherein deformation of the deformable element causes the deformable element to flow with respect to the optical assembly such that, after cooling of the deformable element, the deformable element provides a mechanical barrier to breaking of the engagement made between the optical assembly and the second face of the body around the aperture.

9. A method as claimed in claim 4, wherein the deformable element includes a sleeve disposed about a portion of the optical assembly extending from the second face.

10. A method as claimed in claim 4, wherein the step of deforming a deformable element comprises placing a mounting collar around the potical assembly extending from the second face, and deforming the deformable element to provide fixed engagement between the mounting collar and the optical assembly, and between the mounting collar and the second face of the body around the aperture.

11. A method as claimed in claim 10, wherein the step of deforming the deformable element comprises heating the mounting collar.

12. A method as claimed in claim 10, wherein the mounting collar is connected to a camera assembly.

13. A method as claimed in claim 10, wherein the mounting collar is a part of a camera assembly.

14. An optical assembly kit for use in mounting an optical assembly in an aperture of a body, the body having a first face and a second face between which the aperture extends, the kit comprising:

an optical assembly adapted for placement within the aperture;

a deformable element adapted for deformation after placement of the optical assembly within the aperture such that after the assembly is placed in the aperture deformation of the deformable element causes (a) a flange of the optical assembly to exert a force on the first face of the body around the aperture and (b) a fixed engagement to be made between the optical assembly and the second face of the body around the aperture.

15. An optical assembly kit as claimed in claim 14, wherein the deformable element is adapted to be deformed by heat.

16. An optical assembly kit as claimed in claim 14, wherein the deformable element is adapted to bond chemically on heating to either one or more components of the optical assembly, or the body, or both.

17. An optical assembly kit as claimed in claim 14, wherein the kit further comprises a camera assembly and a mounting collar for mounting the optical assembly to the camera assembly.

18. An optical assembly kit as claimed in claim 17, wherein the mounting collar is adapted to be placed around the optical assembly extending from the second face, such that deformation of the deformable element will provide fixed engagements both between the mounting collar and the optical assembly, and between the mounting collar and the second face of the body around the aperture.

19. An optical assembly kit as claimed in claim 17, wherein the mounting collar is an integral part of the camera assembly.

20. An optical assembly kit as claimed in claim 17, wherein the mounting collar is adapted for engagement with the camera assembly.

21. The method of claim 1 wherein the non-rigid body has a rigidity comparable to a cloth garment.

22. The method of claim 21 wherein the deforming step causes the deformable element to engage the flange and the second face of the body around the aperture.

23. The method of claim 1 wherein the deforming step causes the deformable element to engage the flange and the second face of the body around the aperture.

24. A method of mounting an optical assembly in an aperture of a body, the optical assembly having a flange, the body having a first face and a second face between which the aperture extends, the method comprising:

placing the optical assembly within the aperture; and then fixedly mounting the optical assembly to the body by deforming a deformable element disposed around the optical assembly such that in response to the deformable element being deformed the optical assembly flange exerts a force on the first face of the body and the deformable element is fixedly engaged to the second face of the body around the aperture.

25. A method as claimed in claim 24, wherein the step of deforming the deformable element includes exerting pressure on the deformable element as it engages the flange and the first face of the body.

26. In combination, an optical assembly having (a) a longitudinal axis, (b) an exterior surface extending in the direction of the axis, and (c) a shoulder extending away from the longitudinal axis, a body having a first face and a second face between which the aperture extends, a portion of the optical assembly extending through the aperture so the longitudinal axis extends in a direction between the first and second faces, a deformable element carried by and disposed around the exterior surface and carried by the second face fixedly securing the optical assembly to the body so that the deformable body exerts a force with a component in a first direction on the first and second faces toward the shoulder, the shoulder exerting a force with a component in a second direction on the first face, the first and second directions being opposed to each other and parallel to the longitudinal axis.

27. The combination of claim 26 wherein the deformable member extends through the aperture, opposite faces of a first portion of the deformable member fixedly engaging the shoulder and first face of the body, a second portion of the deformable member fixedly engaging the second face of the body.

28. The combination of claim 27 wherein a face of the second portion extends away from the longitudinal axis along the second face of the body.

29. The combination of claim 28 wherein the shoulder is at right angles to the axis, and the opposite faces of the first portion extend along the shoulder and first face of the body.

30. The combination of claim 27 wherein an end surface of the deformable member engages the second face of the body.

31. The combination of claim 30 wherein the shoulder is at right angles to the axis, and the opposite faces of the first portion extend along the shoulder and first face of the body.

32. The combination of claim 27 wherein the shoulder extends at an acute angle to the axis, one face of the first portion extending along the shoulder, a second face of the first portion engaging only a portion of the first face of the body in proximity to the aperture.

33. The combination of claim 26 wherein the shoulder and exterior surface carry a shell layer, the deformable member bearing on (a) a portion of the shell layer carried by the exterior surface and (b) the second face of the body, the first face of the body bearing on a first face of the shell member opposite from a second face of the shell member carried by the shoulder.

34. The combination of claim 33 wherein the deformable member does not extend through the aperture.

35. The combination of claim 33 wherein the deformable member extends through the aperture into fixed contact with the first face of the shell member.

36. The combination of claim 26 wherein the deformable member extends through the aperture to abut the shoulder.

37. The combination of claim 36 wherein the first face of the body and the shoulder abut.

38. The combination of claim 37 wherein the deformable element extends along and fixedly engages the exterior surface in a direction extending away from the first and second faces of the body and the shoulder.

39. The combination of claim 38 further including a sensor assembly, the sensor assembly including a barrel having an interior surface surrounding the exterior surface and extending in the direction of the longitudinal axis, the deformable element extending along and fixedly engaging the interior surface.

40. The combination of claim 39 further including a mounting collar, the mounting collar including a neck extending between the exterior surface of the optical assembly and the interior surface of the sensor assembly, the neck having interior and exterior surfaces extending in the direction of the longitudinal axis, the deformable member fixedly engaging the interior and exterior surfaces of the neck.

41. The combination of claim 40 wherein the neck, barrel and exterior surface of the optical assembly include ridges and indentions fixedly engaging the deformable member.

42. The combination of claim 39 wherein the barrel and exterior surface of the optical assembly include ridges and indentions fixedly engaging the deformable member.

43. The combination of claim 26 wherein the deformable element extends along and fixedly engages the exterior surface in a direction extending away from the first and second faces of the body and the shoulder.

44. The combination of claim 26 wherein the body is non-rigid.

45. The combination of claim 44 wherein the non-rigid body has a rigidity comparable to a cloth garment.

* * * * *